April 6, 1965             G. M. GIBSON             3,176,697
APPARATUS TO CONTROL THE ACTION OF AND TO DISTRIBUTE
WASHING FLUID IN A DISHWASHING MACHINE
Original Filed Jan. 23, 1961             8 Sheets-Sheet 1
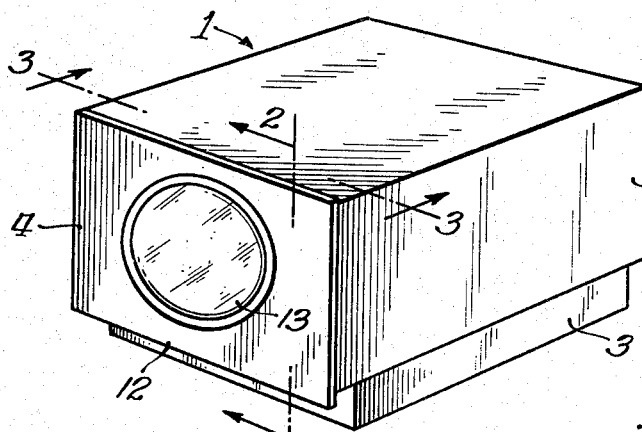
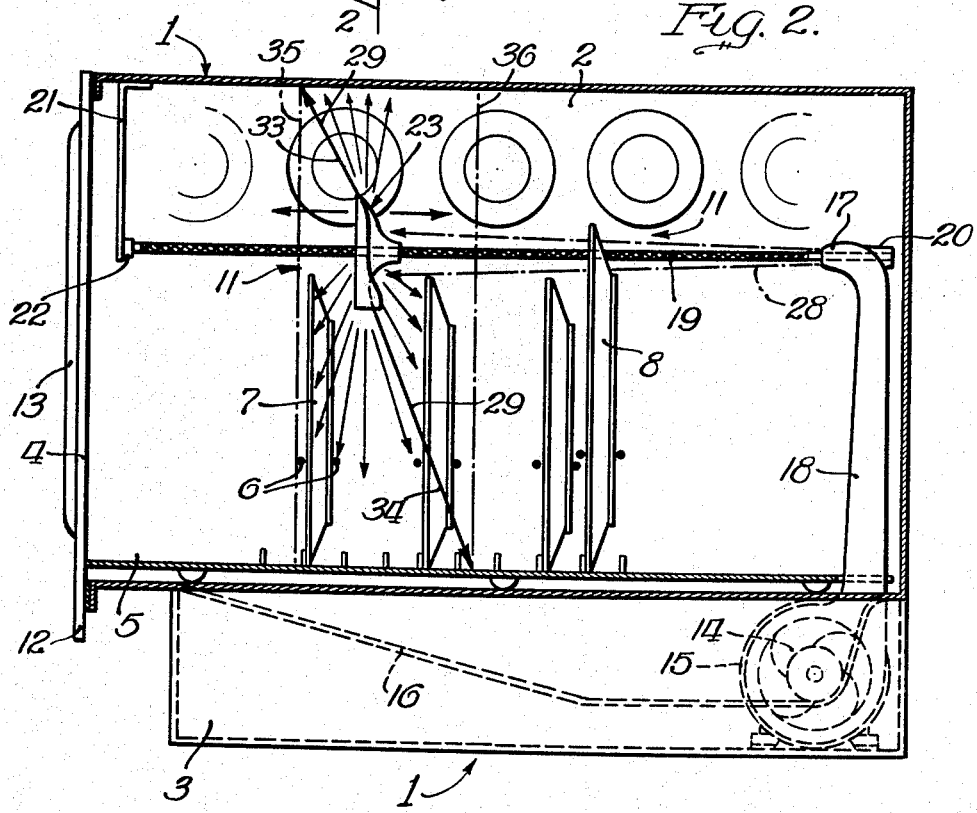
INVENTOR:
George M. Gibson

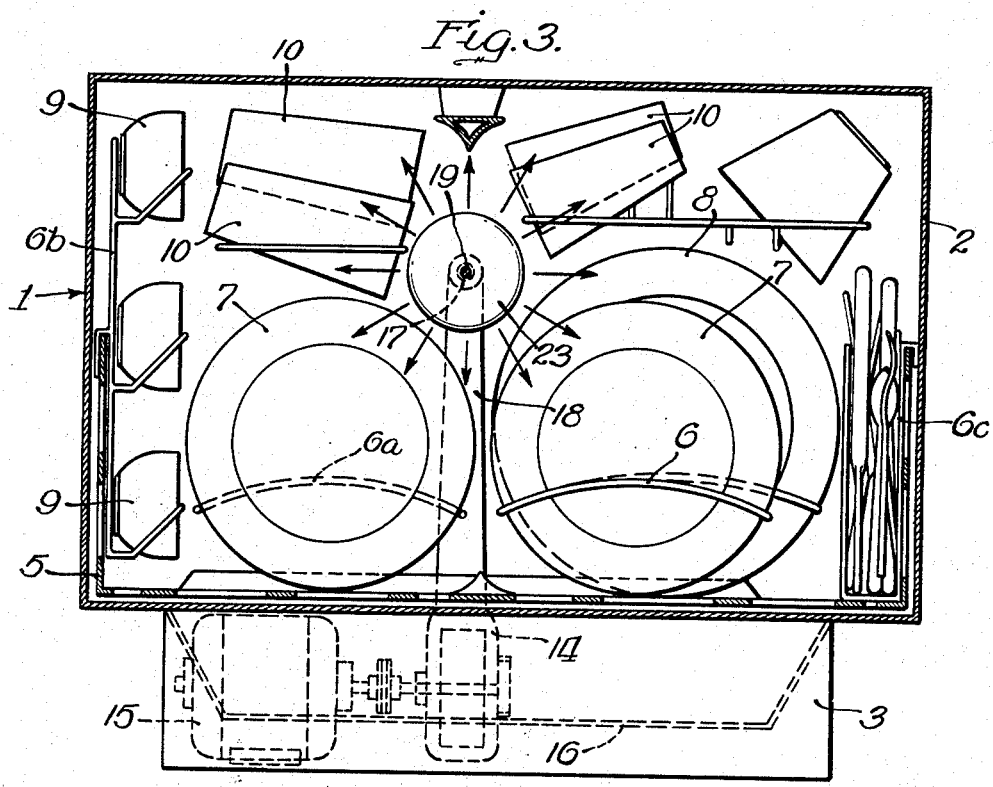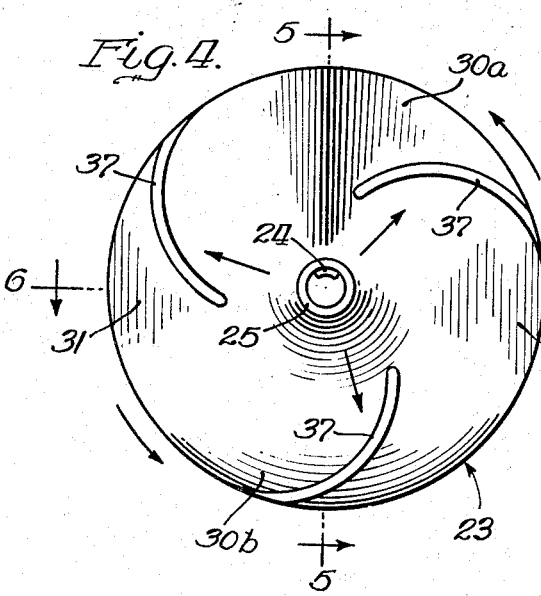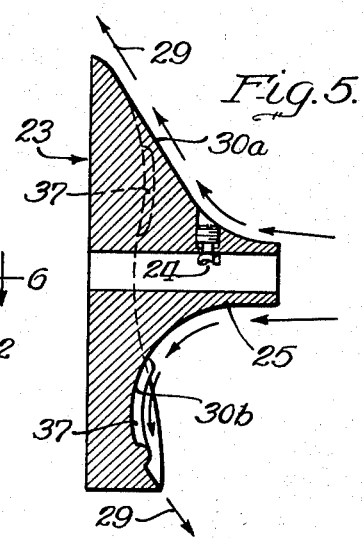

April 6, 1965 G. M. GIBSON 3,176,697
APPARATUS TO CONTROL THE ACTION OF AND TO DISTRIBUTE
WASHING FLUID IN A DISHWASHING MACHINE
Original Filed Jan. 23, 1961 8 Sheets-Sheet 3
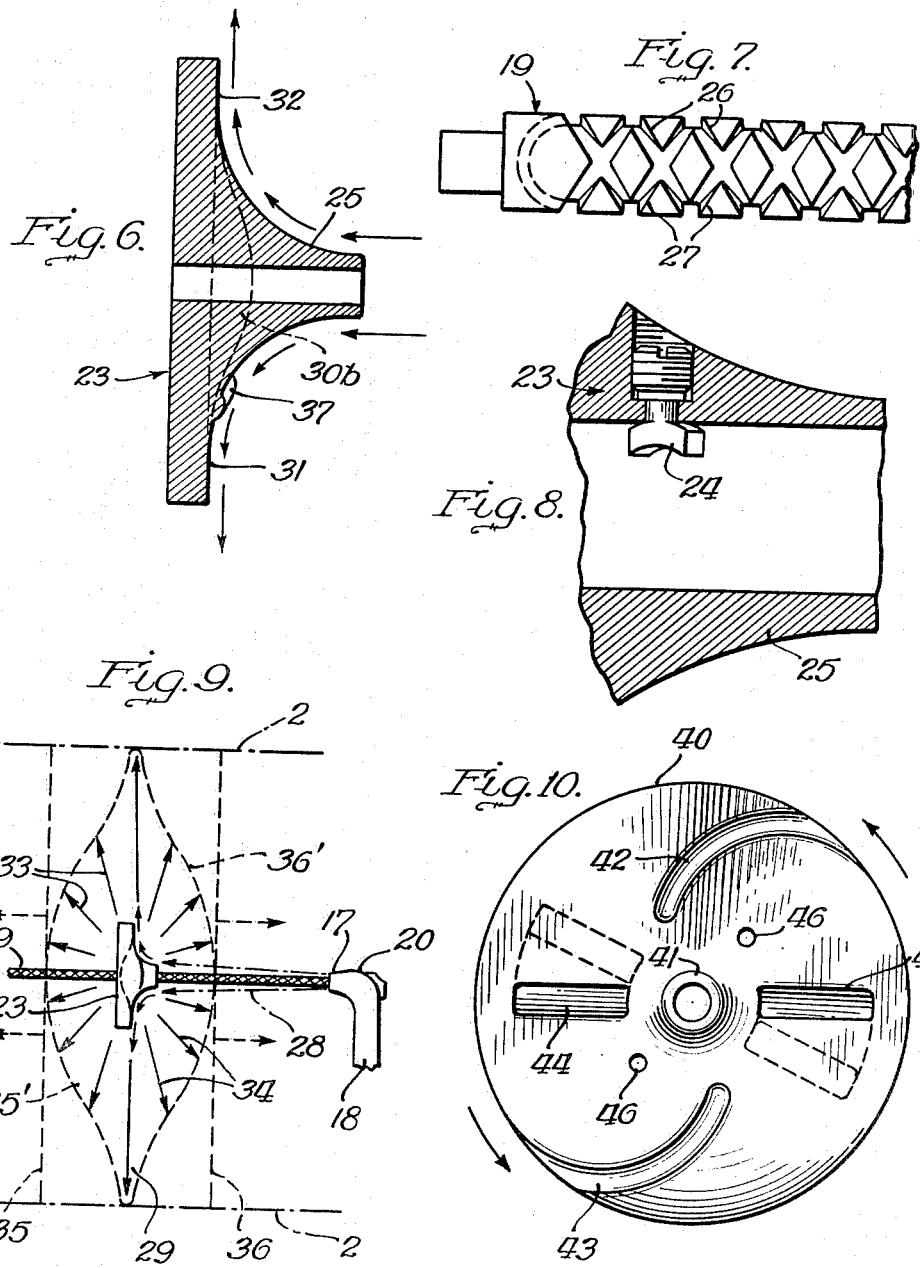
INVENTOR:
George M. Gibson
BY
Eberhard E. Wettly
Atty.

April 6, 1965  G. M. GIBSON  3,176,697
APPARATUS TO CONTROL THE ACTION OF AND TO DISTRIBUTE
WASHING FLUID IN A DISHWASHING MACHINE
Original Filed Jan. 23, 1961  8 Sheets-Sheet 4

INVENTOR:
George M. Gibson
BY
Eberhard E. Wetley
Atty.

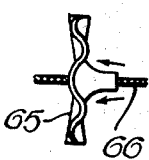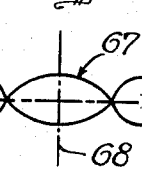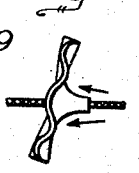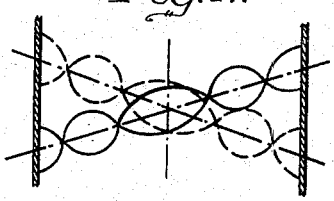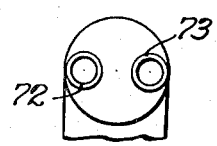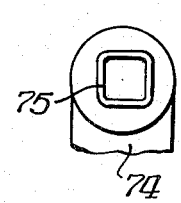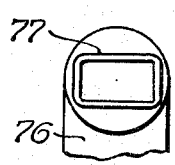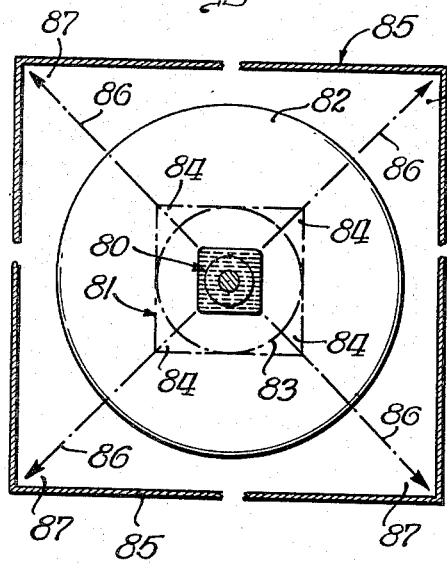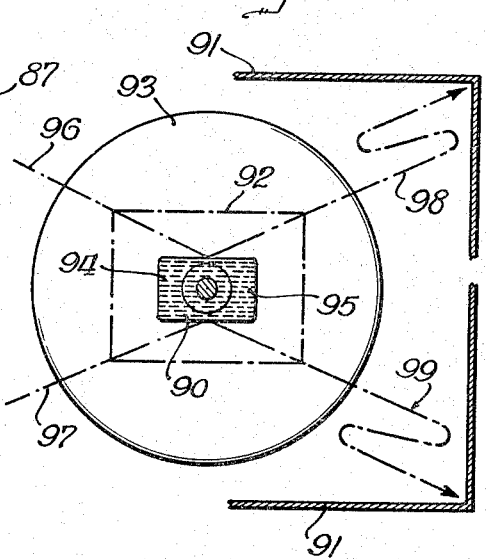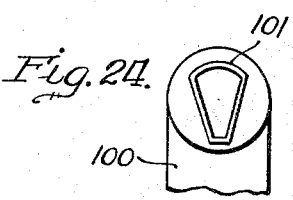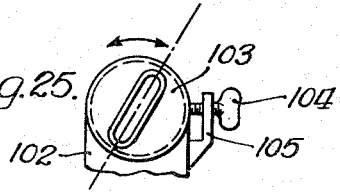

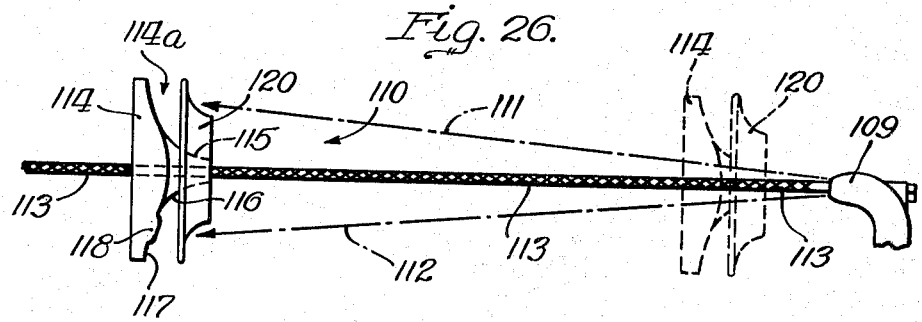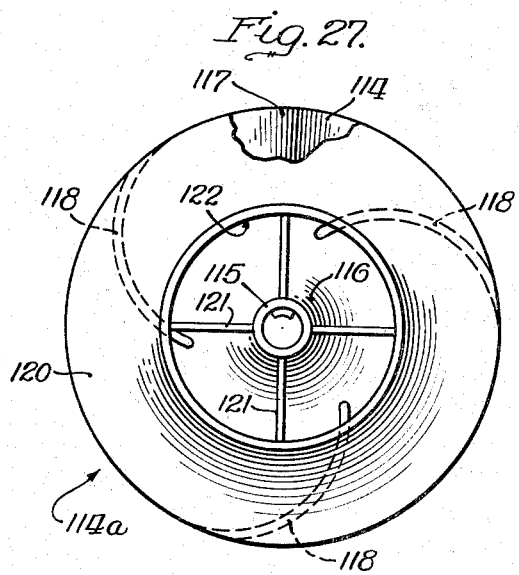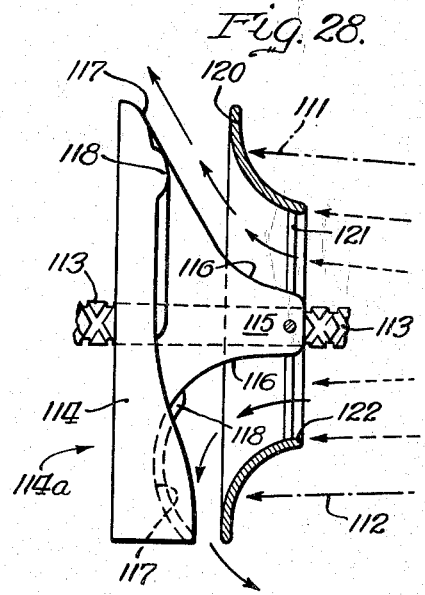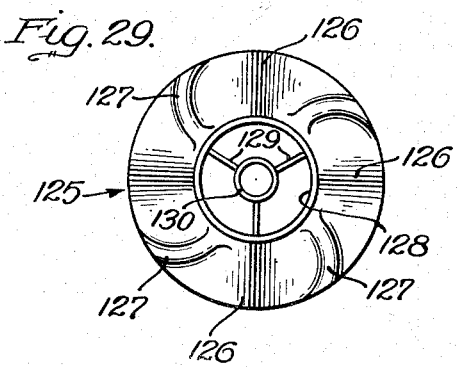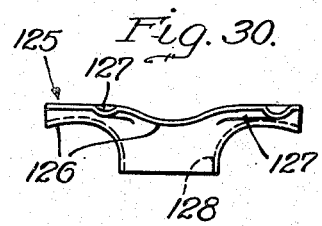

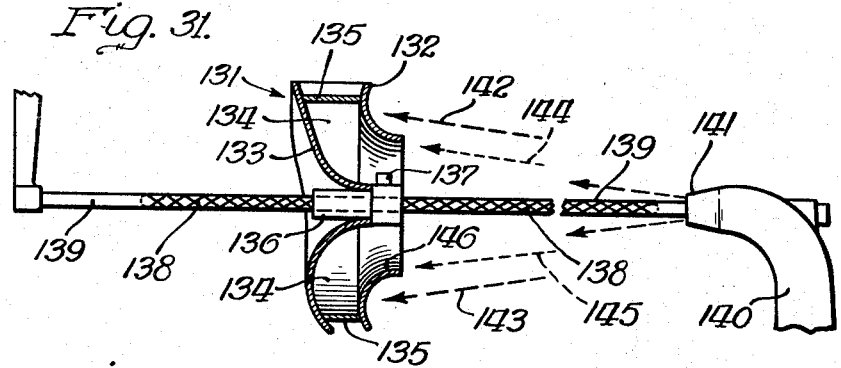
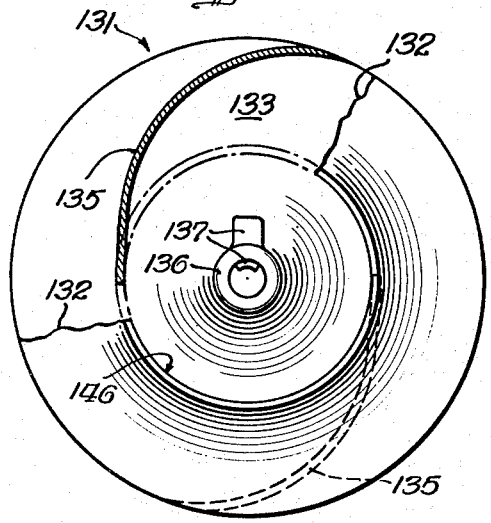
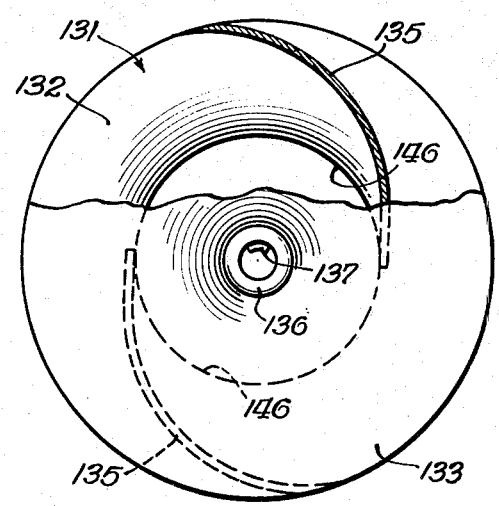
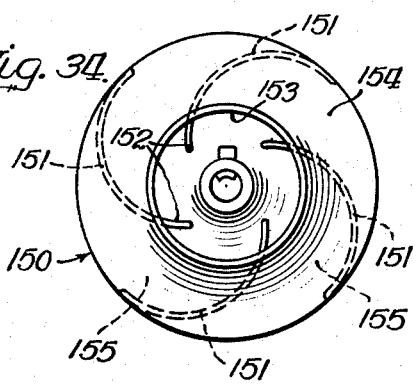
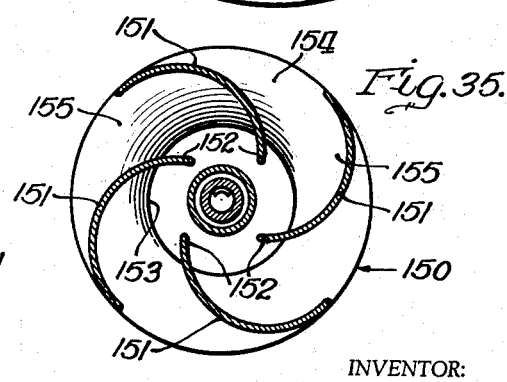
INVENTOR:
George M. Gibson

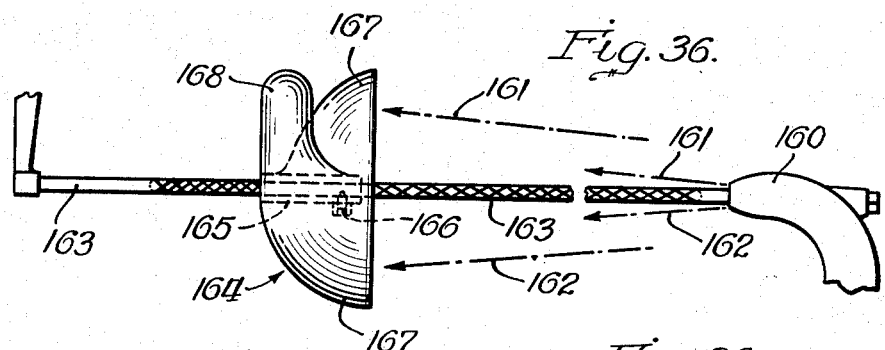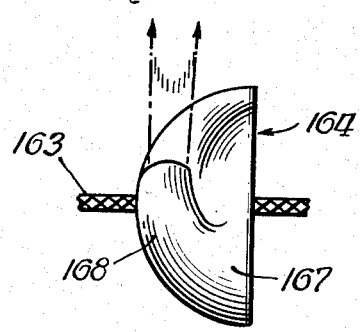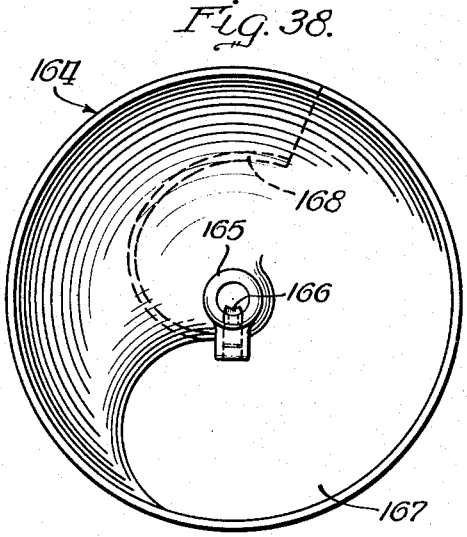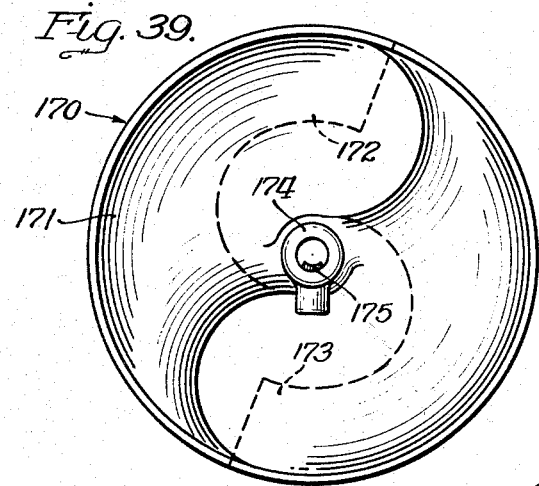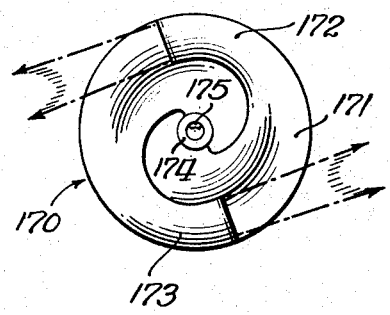

United States Patent Office 3,176,697
Patented Apr. 6, 1965

3,176,697
APPARATUS TO CONTROL THE ACTION OF AND TO DISTRIBUTE WASHING FLUID IN A DISHWASHING MACHINE
George M. Gibson, % G. M. Gibson Corp., Bellevue, Iowa
Original application Jan. 23, 1961, Ser. No. 84,036. Divided and this application May 2, 1963, Ser. No. 277,653
8 Claims. (Cl. 134—183)

This invention relates to a new and novel arrangement of mechanisms adapted for washing articles of similar or varied characteristics and shapes and it is directed to certain new and novel structures for practicing the invention involved. This application is a division of the copending George M. Gibson application Serial No. 84,036, filed January 23, 1961, and relating to a Method and Apparatus for Washing Articles.

More specifically, the invention has to do with a simplified combination of elements providing an apparatus for washing dishes or for washing various multiple articles arranged within a given enclosure or cabinet and under the controlled development of a resultant wash water activity to establish a predetermined pattern of washing activity within such an enclosure or within the confined cabinet space.

Many different types of structures and mechanisms have been developed and produced in the past for washing articles, and more specifically for the purpose of washing and cleaning dishes. The general trend has been to create as much water activity as possible without devoting much thought or direction to control the exact method of water supply and distribution, or to develop any precise pattern of water action which would create and provide optimum washing results coupled with a highly efficient and effective cyclic wash water pattern of operation of a machine of this general nature.

The washing action herein taught has been developed to follow a controlled pattern of operation wherein large volume quantities of washing fluid are kept under restraint for terminal contact directly with the dishes in a given planned manner. Not only is the water action herein disclosed concerned with supplying comparatively heavy wash water impact against the dishes, but considerable regulation has been given to the actual performance of the wash water to establish a water sheet or wall of water providing a pulsating wavelike discharge to engage, for example, in an undulating fashion, both sides of the plates or to make opposite angular contact against other articles arranged for cleaning within the space of the wash water activity.

The water sheet or wall of water is controlled to not only follow an angular discharge pattern with respect to its point or origin or area of generation, but the sheet or wall of water also is made to follow a 360 degree swirl pattern about an axis lying between the dish group or cluster so as to develop a fanlike wave of swirling water that impinges generally edgewise over a given radial zonal area to wash and clean the dishes or articles lodged within the zoned area served by the swirling undulating pattern described.

In furtherance to the projected method herein practiced, the location point or area of jet spray origin is so activated as to move along a given path of travel to thereby create a washing means that effectively serves successive fractional portions of a complete washing space holding and/or confining the articles being washed and cleaned. Not only is the apparatus concerned with fractional or segregated proportional cleaning zones, but the point of deflected wash water origin is made to change location and to move back and forth or to and fro along a given path of travel whereby the effective washing action is made to vary over segregated dish groups to successively and repeatedly contact the various dish groups in different directions to interpose or bring about cyclic virtual non-washing intervals or phases of lessened washing activity in a given area to permit drainage of the spent wash water from such an area. The swirling undulating sheet of water is made to originate at successively changing points of generation lying generally along the path of the supply stream or jet.

It has been found that continuous water impingement upon an article or a dish without providing certain allowances for drainage water clearance tends to build up a film or quantity of insulating liquid, so to speak, which must be dispersed or penetrated before active wash water impact may do its most efficient work in the cleaning surface area of a dish. The establishment of certain virtual nonwash intervals is considered an advantageous solution to some of the objectionable factors that actually interfere with efficient effective cleansing action.

Since it is one of the prime considerations of the novel apparatus herein disclosed to supply a heavy stream or jet of wash water under pressure to an immediate source point of water distribution, the new apparatus contemplates using a concentrated wash water stream directed across the cleaning space free and clear of the grouped or clustered dishes directly and precisely to a selected point of origin for the wash water deflection to create a swirling undulating heavy wash water sheet that is made to directly strike the dishes. A rotatable surface means is placed at the selected origin point to develop a pulsating wavelike and deflected water sheet and, as in this case, the supply water kinetically activates the rotatable surface means to carry on the compound water pattern sought, and rotation of this surface means provides the activation whereby this origin point is moved toward and away from the supply point or source of the discharge of the supply stream. Thus the supply stream causes the rotation of and the bodily movement of the wash water dispersion means. Obviously the invention may be practiced or executed by various mechanical means producing like results, but the use of the wash water under controlled reactions and diversions is considered to be one of the simplest ways in which to carry out the inventive concept.

The washing mechanisms herein devised provide the end result of causing heavy volume water to act in swirling undulating activity to directly strike or impinge upon the surfaces of the dishes or other articles and from various successive points relatively near to the dishes being processed. It has been determined that present day and former apparatuses or combined mechanisms now in use for washing dishes lack real effective heavy volumetric water striking effectiveness and do not establish controlled heavy forceful washwater impingement results. The objection is that too much mist or finely divided washing fluid is created for the final impingement on reaching the articles being washed, the fault becoming exceedingly more noticeable in regard to such action when considering the more remote articles. In parallel with the above described result, the water sprays now in use greatly lose their kinetic power in passing through various conduits, ducts and nozzles, as well as in operating the distribution instrumentalities, so that when it comes to the final cleansing impact action required, the actual water action is both weak and comparatively ineffective. While it may appear that great wash water activity exists, the real end result hoped for is not actually effectively attained and a good deal of the wash water not only misses the articles, but merely comes into wetting contact with the articles or with the limiting enclosure walls which are not part of the article load requiring cleaning. The apparatus herein disclosed is considered a solution to the problems that will correct the deficiencies pointed out above and which will provide a new and novel washing operation that effectively cleans and washes articles in a comparatively short interval of time coupled with good and complete cleaning end results. The water action is controlled from start to impact and the wash water is maintained in strong kinetic volume and quantity directly aimed at the articles in a given functional and cycle manner to reduce the swirling undulating wash water travel to a minimum distance before article contact. This entire action is supplemented by the virtual inactive drain intervals for the purposes previously mentioned.

It is an object of the present invention, therefore, to wash and clean dishes or other articles by providing a combination of mechanisms that generate a constant supply stream of washing fluid for continuous aerial discharge under pressure conditions and guided into a path across a dish holding and/or confining enclosure toward a predetermined point for deflective dispersion from such a point into a sheet or wall of water comprising an undulating swirling abundant wash water distribution for heavy impingement over relatively short travel impact paths to efficiently and effectively wash dishes or articles arranged within such an enclosure.

It is another object of this invention to provide an apparatus for washing dishes or other articles wherein a concentrated wash water supply stream or jet is directed along an open lane between dishes and across an enclosure holding and/or confining dishes, and wherein such stream is reshaped and converted into a wash water wall formed into a radiating pattern created about the path of travel of the main stream, such water wall being rotated bodily to serve all dishes in that radial area about the stream, and to simultaneously cause the point or source of wash water wall creation to bodily change its location along the line of travel of the supply stream.

Another object is to wash articles or dishes with a circular swirling water pattern that is bodily movable from side to side, to and fro or up and down across an article or dish holding cabinet to successively and repeatedly wash certain of the articles or dishes of the entire group in said cabinet, while providing dish draining intervals of lessened or no activity between the cyclic washing periods.

Another object is to provide an apparatus for washing dishes or articles which includes the provision of a pulsating wave form of wash water to create a film like water pattern radiating about a given axis, but in a wave form of radial edgewise impingement action engaging a 360 degree area in a given zonal plane, causing the impinging water to be directed in advance to and to the rear of such a zonal reference plane as well as adjacent to or directly medially coincident with that zonal plane.

A still further object is to provide a novel apparatus for washing articles or dishes by the wave form of water action expressed in the previous paragraph, but with the added combination of an action that causes the source or point of origination of the wave form water action to move bodily back and forth, or to and fro along a given path between the dishes or articles in a group or cluster surrounding the jet or supply stream travel of the movable point of origin.

As another object, this invention provides a means for washing dishes or the like by a concentrated wash water supply made available at a given point from which it is dispersed by a rotatable surface into a deflected diversion pattern and wherein such a formed water sheet pattern is continually rotated about a given axis of action and wherein the original stream of wash water imparts the motivation to induce rotative actuation to the rotatable surface to carry out the rotary water slinging sheet or water diversion and undulating action herein developed.

In the control or regulation of the actual delivered water pattern for striking and washing dishes or the like, it is an object of this apparatus to also formulate a supply stream having a predetermined cross sectional form to thereby anticipate the development of a selected converted or deflected wash water sheet having a discharge pattern of a variable volumetric water distribution and impingement within the 360° extent of this rebounding water activity zone or enclosure. Thus, without changing the discharge quantity of the jet stream, its cross sectional area may be made to follow given shapes conforming, for example, to the cross sectional nozzle exit shape from which point the jet is generated and directed. By developing a stream having a predetermined initial cross sectional shape bearing a configuration similar to or in variance with the cross sectional shape or area of a dish confining enclosure, water deflection follows a given flow pattern, so to speak, serving certain enclosure portions with greater or lesser planned water volume impingement activity.

Another object of this invention is to teach a washing method wherein the water pattern is controlled in the open and within the open area of the washing enclosure from the point of discharge to the point of impact or impingement by aerial manipulation and by deflection. This promotes freedom of kinetic water action with a minimum amount of hydraulic friction, churning or eddy current action. This is also of vital advantage over systems that resort to piping, conduits, small discharge openings and to other analogous structures of like character, not to mention the difficulties encountered by clogging of such devices and the openings therein by food particles and the like under recirculation of the wash water.

Other objects and advantages relating to the new and novel apparatus for washing dishes or other articles shall hereinafter appear in or become evident from the following detailed description having reference to the accompanying drawings forming a part of this specification.

In the drawings:

FIG. 1 is a diagrammatic perspective view of a dishwashing machine providing one exemplary construction of a device adapted to wash dishes according to the present new and novel controlled washing method of this invention;

FIG. 2 is a longitudinal vertical cross sectional view of the washing machine taken substantially along the plane of the line 2—2 in FIG. 1 to generally illustrate certain details of the one form of apparatus adapted to carry out the washing process under the method herein disclosed;

FIG. 3 is a vertical transverse cross sectional view of the machine as taken substantially along the plane of the line 3—3 in FIG. 1 to show other details of construction of the operative mechanisms of the dishwashing machine;

FIG. 4 is an enlarged inner face view of the hub side of the rotary means employed to provide a rotatable surface area thereon that functions to convert and redirect a supply stream of washing fluid into a radial sheet of wash water assuming a fanlike pattern under a circular wavelike pulsating undulating sequence all carried out and developed under the active rotation of said rotary means;

Figure 11:
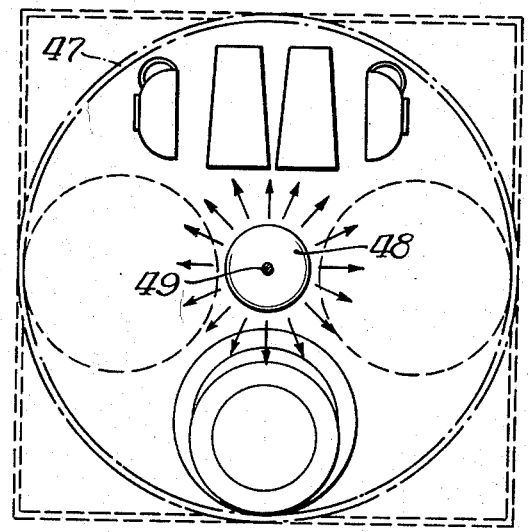
Figure 13:
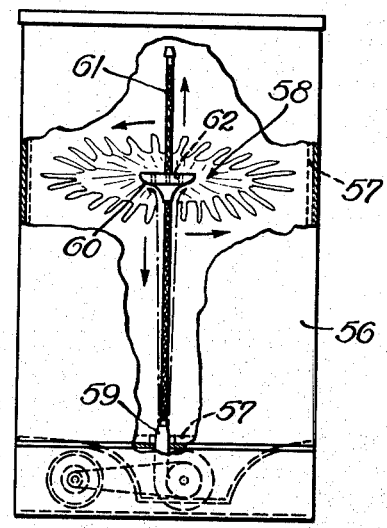
Figure 12:
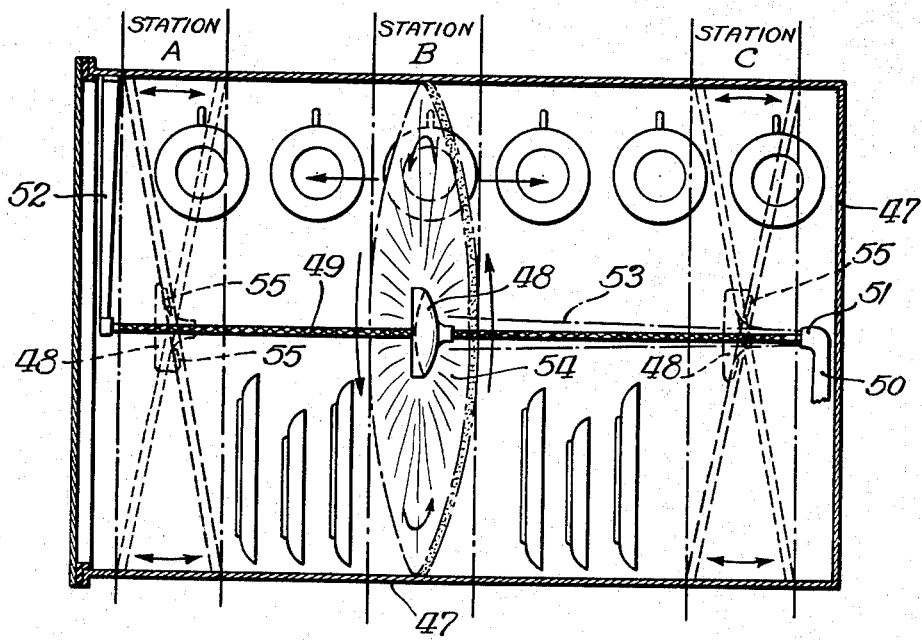

FIGS. 5 and 6 are radial cross sectional views taken along the planes of the lines 5—5 and 6—6 respectively as shown in FIG. 4 to illustrate certain of the details of construction of the rotatable vaned fluid deflector;

FIG. 7 is a side elevational view of a fragmentary portion of a double threaded screw that supports the deflector and upon which screw such deflector revolves under water action and travels bodily back and forth along the screw under the kinetic action of the supply fluid stream that is directed upon such deflector;

FIG. 8 is a detailed fragmentary sectional view of the driving key means on the deflector that is adapted for screw connection;

FIG. 9 is a general diagrammatic view of the deflector action and function to cause the jet spray diversion into a given undulating rotating sheet of water according to the principles of the present invention;

FIG. 10 is a face view of a deflector providing certain modified structure to create certain controlled water action to obtain the objectives of the method disclosed;

FIGS. 11 and 12 are front end and side elevational views in section to diagrammatically illustrate the principles underlying the apparatus of this invention;

FIG. 13 illustrates another washing machine arrangement incorporating an arrangement to serve another adaptation of the same principles;

FIGS. 14 and 15 show a special type of rotatable deflector and the water pattern developed thereby;

FIGS. 16 and 17 show another variation in a rotatable deflector and the resultant water pattern developed therefrom;

FIGS. 18 to 21 are fragmentary views of the discharge heads of water stream supply means to illustrate different water outlet nozzle shapes to develop or create feed streams of different cross sectional shapes for contacting the deflector means;

FIGS. 22 and 23 are diagrammatic views to explain resultant functions of square and oblong supply streams in the washing enclosures;

FIGS. 24 and 25 are views of other water supply heads to illustrate modified nozzle variations and the functions thereof as they apply to the method of this invention;

FIG. 26 is a diagrammatic side elevational view of a modified deflector and water dispersion unit;

FIG. 27 is an enlarged face view of the water action side of the deflector unit shown in FIG. 26;

FIG. 28 is an enlarged edge view of the deflector unit with parts thereof being shown in cross section;

FIGS. 29 and 30 are face and edge views of a modified water shield member for use in connection with a deflector of the kind illustrated in FIGS. 26 to 28;

FIG. 31 is a fragmentary side elevational view of a modified construction of the washing mechanism of a dishwashing machine which provides a sheet metal form of deflector having a deflecting shield and performing much in the same manner as the arrangement shown and described in FIGS. 26 to 30;

FIG. 32 is a front face view partially broken away and in section of the deflector of FIG. 31, enlarged somewhat to better illustrate certain details of construction thereof, the deflector being shown as removed from its supporting guide rod carrying the thread structure;

FIG. 33 is a rear face view of the same deflector partly broken away to better illustrate the relationship of the deflecting shield and the deflecting areas, each being defined by walls that cooperate to establish a hollow chamber deflector including vanes for inducing rotation under water action;

FIG. 34 is a face view of the front part of a deflector, in elevation, employing multiple vanes as division members to divide the deflector into spiral or curved water flow chambers;

FIG. 35 is a vertical cross sectional view of the deflector of FIG. 34 taken through the hollow chamber portion thereof and in a plane situated parallel to the front and rear faces of the deflector;

FIG. 36 illustrates a side elevational view of a modified dish water impingement mechanism providing a cup and spout assembly as a deflector for the purpose of gathering the entire water stream and diverting the stream into areas that funnel the water into at least one discharge spout for washing action, the shape of the spout also imparting rotation to the deflector under water flow action;

FIG. 37 is a side elevational view of the deflector of FIG. 36 as viewed from the upper edge in the latter figure;

FIG. 38 is a face view of the deflector from the receiving cup part thereof on an enlarged scale to better show certain structural details thereof;

FIG. 39 is a similar front face view of a deflector of the kind shown in FIG. 38, with the cup part diverting the stream into areas contiguous with at least two discharge spouts to provide multiple radial water discharge jets or the like from a deflector of this type;

FIG. 40 is a rear face view of the deflector of FIG. 39 to show the spout arrangement more clearly and the general water pattern developed thereby as indicated diagrammatically by the arrows and broken lines.

In one embodiment of the invention herein disclosed and as shown in FIGS. 1, 2 and 3, the device comprises a conventional dishwashing machine 1, having a cabinet 2 to enclose the washing area or space within which the dishes can be held and confined for cleaning purposes, the cabinet being suitably supported upon an auxiliary base or housing 3 which confines drain structure, motor, pump and other operating mechanisms of the machine.

A combination dish supporting assembly is provided comprising a closure door 4, a drawer 5 to carry dishes directly or to carry wire trays or baskets such as 6, 6a, 6b and 6c for holding dishes such as plates 7 and 8, cups 9 and glasses 10, as well as cutlery baskets or racks 6e, etc. Suitable tray arrangements my be employed to orient the dishes in the most convenient loading positions commensurate with the most efficient reception of washwater impingement. FIGS. 2 and 3 illustrate a preferred placing of the dishes leaving a clear avenue or open lane at 11 that ranges across the cabinet 2 from front to back which will provide a clearance area for the washing fluid mechanism herein disclosed. The plates such as 7 and 8 are, however, best accommodated in the cabinet 2 in closely spaced vertical positions to assemble a good load, the plates being arranged in transverse positions to most efficiently accept the controlled wash water action of the undulating wheel of water which acts to sweep or strike against and between the plates in angular radial and fore and aft directions thus contacting both the faces and the bottom of the plates during the machine washing operation.

For convenience, the door 4 may depend or extend downwardly as at 12 to provide a hand hold for pulling the drawer assembly with its dish load out of the machine. The door preferably has a viewing window 13. In general, the entire door and drawer construction and cabinet may include suitable rails and wheels to guide and support the dish holding assembly, plus sealing gaskets on the door and cabinet and suitable latch means may be used to hold the parts in their required working positions. The trays and/or racks may also vary, but in general, FIG. 3 portrays one good arrangement for the articles being washed. As previously stated, the plates should be carried on end or upright and are best cleaned when arranged as shown in the drawings in practicing the method herein taught in producing the controlled water action to clean the dishes.

The washing mechanism comprises a pump 14 driven by a motor 15, the pump receiving its water supply from a reservoir or drain pan 16 and discharging the water through a head 20 having a nozzle 17 carried upon a discharge standpipe 18, the nozzle being directed horizontally across the cabinet and through the lane 11 previously described and without dish contact. A sturdy reverse threaded screw 19 is supported at one end in the pump nozzle standpipe head 20 and the screw extends in suspended fashion to a terminal position adjacent the cabinet door 4. The screw 19 can be light in weight and rigid for fairly stable support as shown, but if necessary or desirable, a small hanger 21 may be suspended from the cabinet to hold a bearing 22 to stabilize the outboard end of the reverse threaded screw 19.

A wash water deflector 23 is mounted upon the screw 19 for free rotation thereon. The deflector 23 is made to securely carry a swiveling driving key or lug 24 in projected relation within the hub 25 to ride freely in the line of the screw threaded sections of the screw 19.

For purposes of explanation, the threads 26 are slanted in one direction to advance the deflector toward the door 4 and the threads 27 are slanted to return the deflector toward the nozzle 17 which provides the point of origin of the stream of wash water supply. The threads 26 and 27 are continuous and connected at their ends on the screw 19 to reverse the travel of the deflector by its swivel key back and forth along screw 19 as the deflector is made to revolve on the screw, the latter being fixed in the construction suggested.

The deflector 23 per se provides the means instrumental to redirect and to convert the main supply water stream, the latter being diagrammatically indicated at 28 in FIGS. 2 and 9 in the drawings. It is this rotatable unit 23 that provides a rotatable surface in the path of the supply stream to intercept the movement of such a stream and to redirect the same in a fanned out wavelike sheet such as 29 which expands radially into the cabinet away from the axis of screw 19 and away from the general axis or median travel line of the concentrated wash water supply stream 28.

The deflector structure 23 is best shown and described in connection with FIGS. 4, 5 and 6. Its hub side face provides a compound surface configuration which is partially convex as at 30a and partially concave as at 30b, with connecting contiguous surface portions that smoothly join these two surface areas to establish intermediate contiguous face portions such as 31 and 32 that are formed to lie at right angles to the axis of rotation of the deflector.

When the supply stream 28 impinges on the hub face area of deflector 23 and preferably near and about the hub thereof, the stream 28 converts into the water sheet 29, some of which being directed angularly in the advancing direction of the rotating deflector as at 33, and some of which is directed reversely angularly away from the rotating deflector as at 34, all shown in FIG. 2. Obviously, some of the undulating sheet of water 29 will be directed in less severe angular directions between the two extremes of the hub face configurations shown at 30a and 30b, as the sheet or wall approaches the right angle discharge surface portions 31 and 32 of the deflector. The water sheet will assume a wave form having the same general configuration of its forming surfaces on the deflector 23 only in radially expanded form for dish impingement.

Considering this above noted action wherein the water wall or sheet is carried back and forth upon rotation between a depth of radial zonal area bounded by lines 35 and 36 in FIGS. 2 and 9 for one given position of the rotatable deflector 23, a circular pulsating wave action results which carries the controlled water sheet 29 back and forth into a fractional or divisional area of the total dish washing space in cabinet 2.

By revolving deflector 23 at a selected rate, this active swirling wave water sheet advances and retracts bodily in relation to the source point of the supply stream 28, causing repeated active washing impingement of water on dishes that are lodged in the advancing and retracting zonal areas, allowing cyclic intervals of drainage to result between the successive swirling water passes over the dishes. The passes of diverted water have pulsating to and fro action in bodily progression in either direction through the machine as above noted.

As a further means to rotate the deflector 23 to follow the process of washing herein disclosed, the deflector has curved low height vanes such as 37 located on the hub face side of the deflector to react under the impingement of stream 28 as it strikes the deflector. Thus the same supply stream provides the activating medium to revolve the deflector to establish the wavelike undulating water condition setting up the water pulsations and radial water expansion, and to also cause the deflector to bodily advance and retract along the screw 19 thereby establishing the successive and repeated radial and progressive zonal action back and forth within the cabinet. And the action prevails in the path of the water supply stream moving toward and away from the point of origin of the supply stream for propagating the washing operation. FIG. 9 is used to demonstrate the general action developed in a given zone to create a fanned out water sheet or wall with the general configuration shown in broken lines.

The deflector 23 previously described establishes one form of water sheet across the cabinet or enclosure supplemented in its other movements by the rotary action causing bodily displacement acquired from the supply spout or water stream coming into contact with the deflector. FIG. 10 illustrates a modified deflector 40 having a given facial contour on the side of the hub 41 which contour may be similar to that found on deflector 23. To impart rotation to deflector 40, certain curved recesses such as 42 and 43 may be employed in place of the raised vanes 37 on deflector 23.

If greater turning action is required, openings 44 and 45 can be formed through the face area of the deflector 40, the openings receding diagonally in similar directions about the axis of the deflector. Some of the water striking the face of the deflector will enter openings 44 and 45 passing freely therethrough and imparting rotary action to the deflector.

The same deflector can further be provided with openings such as 46 that merely permit water to pass through the deflecting surface to the other side of the deflector to be discharged into the air under the pressure of the water that is built up on the area surrounding hub 41 by the supply stream.

For purposes of better understanding the entire action of the water and its control in carrying out the various actions explained, FIGS. 11 and 12 are representative of what happens in the washing enclosure. The cabinet 47 is shown as a cylindrical unit, which could be square as indicated in broken lines, wherein dishes are grouped as schematically shown. A deflector 48 rotates upon a screw shaft 49 carried by the head 50 of nozzle 51 and by a bracket 52. Nozzle 51 delivers a spout or stream of wash water 53 against the central face area of the deflector 48, the face area being here shown as flat in contour to develop a flat radiating disc of redirected wash water shown at 54.

Suitable vanes 55 impart water driven rotation to the deflector 48 to revolve or swirl the sheet of disc water which actually wobbles as shown in stations A and C, in broken lines, for a 180° turn of the deflector. Upon rotation, the deflector 48 moves bodily and the water disc shown in station B position in full lines will wobble to follow an undulating action for the impingement water and the disc will move bodily between the respective positions shown in stations A and C or somewhat therebeyond as governed by screw 49.

If a cabinet of different configuration is used as in FIGS. 2 and 3, or a square cabinet as outlined in FIG. 11, the water disc 54 would reach out to the corner areas at the wobble limit lines of the station B, which action is related to the contour of the peripheral limits of the enclosure.

FIGS. 11 and 12 well illustrate the angular approach of the water wheel disc in being able to enter the spaces between the plates in oppositely directed angles for servicing one face or side of one plate and the other side or face of an adjacent plate. Other dishware such as cups or glasses are also serviced by the back and forth sweep of the water disc which supplies good concentrated water volume in a repeated and progressive fashion to successive areas in the cabinet, first in one direction and then in the opposite direction considered with respect to the approaching stream or spout of supply water 53.

In FIG. 13, a dishwasher is shown that provides a vertically arranged cabinet 56 having a dish basket 57 serviced by a water disc 58 that travels bodily up and down vertically in this instance.

The pump nozzle 59 establishes a vertical water spout or stream aimed at the deflector 60 that travels on an upright reversing screw member 61 in like manner as in the other discussed forms of the invention. The deflector may have water bypass openings 62 therethrough to enter the area beyond the far side or upper face of the deflector 60 if desired.

FIGS. 14 and 15 were added to show a wavy surfaced deflector 65 on a screw 66, which deflector will send off an impingement water pattern having a maximum water engaging path 67 about an axis 68 in a cabinet 69. FIGS. 16 and 17 show the same arrangement except that the deflector is made with its effective median surface plane disposed on an angle with respect to the screw axis to develop a compound wavy wobble pattern as shown in FIG. 17.

FIGS. 18 to 21 illustrate different nozzles to generate or originate different spouts or supply streams of different cross sectional shapes. In FIG. 18, the head 70 has a round discharge nozzle 71 which is of the character shown in the forms hereinbefore described. In FIG. 19, dual round discharge nozzles 72 and 73 are used on a head to carry the water into laterally concentrated areas on the deflectors.

FIG. 20 has a head 74 with a square nozzle opening 75, while FIG. 21 shows a head 76 having an oblong nozzle opening 77. Each of the described nozzle projected streams forms an impact pattern upon a deflector to develop a controlled conversion pattern in a wall or sheet of water having volumetric distributive values to obtain resulting wash water impact variations, which are controlled within a dishwashing enclosure.

To illustrate, FIG. 22 diagrammatically demonstrates how a square wash water stream 80 can be propelled to strike a square area 81 on a deflector 82. The circle 83 shows how a round stream will hit the deflector, so that in contrast, the excess corner portions 84 of a square stream furnish excess water in the regions shown to be redirected by the deflector. With a square enclosure as diagrammatically portrayed by the cabinet 85, the excess water quantity portions 84 will be radiated in the general directions of arrows 86 toward the corner areas 87 of the cabinet, supplying heavier water distribution or penetration to the farther reaches of the cabinet 85, while providing proportionately less water discharge to the nearer enclosure limits.

While FIG. 22 places the water spout or stream 80 centrally of the cabinet, this location may be shifted to additionally vary the impact pattern in relation to the cabinet walls or in relation to the grouping of the articles in a cabinet. One example of such a variation in the spout or stream location appears in FIG. 3. A nozzle of the character shown in FIG. 20 is the type of water generating means that will develop the stream 80 of the FIG. 22 arrangement.

In FIG. 23, by employing a nozzle such as 77 in FIG. 21, an oblong or rectangular stream 90 is developed to act in an enclosure of rectangular configuration such as cabinet 91. The general spout impact area 92 is indicated on the deflection surface of the deflector 93. It should be observed that the spout is with its long dimension in a lateral direction providing excess water quantities at 94 and 95 to each side of the axis of the spout. The resulting pattern will cause greater water sheet deflection by spout portion 94 in the radial area confined generally to the space between lines 96 and 97, while spout portion 95 serves the general area between lines 98 and 99. Both areas are in the direction of the greatest width of the cabinet 91. In FIG. 23, spout 90 can also be shifted into certain desired locations in the cabinet from the midpoint location shown.

To further illustrate other changes in spout sections, FIG. 24 has a head 100 with a nozzle 101 of a configuration to place the greatest wash water volume toward the upper side for deflector contact on its upper area.

FIG. 25 provides a head 102 with a rotatably adjustable elongated nozzle 103 that may be angularly shifted to suit conditions and the nozzle is secured in a selected position by a thumb screw 104 on the head arm 105.

To further supplement the hereinbefore expressed fundamental concept of an apparatus for washing dishes, FIGS. 26 to 28 portray an apparatus and means to enhance the general efficiency and operation of a dishwashing machine of the kind previously described and under certain conditions of operation.

It is understandable that the spout or water supply stream will expand radially as it moves away from the discharge end of the pump and nozzle means. The amount of spread of the stream can, to a great extent, be controlled by the nozzle and by the pressure action of the pump. To supply excess water pressure for the control of stream spread over normal amounts would normally lead to pump stress and inefficiency, with accompanying additional power requirements and excessive wire drawing action at the nozzle mouth.

Another way to accommodate the water impingement of an expanded stream as it moves to a remote area away from the nozzle would be to enlarge the diameter of the deflector. However, this adds weight and necessitates heavier parts for the entire water action equipment and also robs the dishwashing cabinet of valuable dish carrying space to accommodate the enlarged deflector as it travels to and fro through the cabinet.

FIG. 26 represents a structure that will operate with efficient pump and nozzle discharge performance and still permit the effective use of a water conversion deflector of relatively small diameter. The structure noted comprises a pump supply nozzle 109 to project a stream or water spout 110, generally outlined by the broken lines 111 and 112, that expands radially outwardly as the distance from the nozzle increases. A reversible screw 113 is fixed in relation to the nozzle and is suitably supported at some outward point while the screw 113 freely carries the water deflecting unit 114a for rotation on the screw. As in the hereinbefore described deflectors, the unit 114a has a deflector 114 similar in design and operation as the described deflectors including a hub 115 with curved expanding surfaces 116 that divert the water stream in expanded funnel fashion onto contiguous radially arranged surfaces 117 which develop a water pattern discharge in radial direction to screw 113. Surfaces 117 include vanes 118 that react to the impingement water to impart rotation to the deflector.

Obviously, by holding the supply stream close to the central or hub portion of the deflector 114, the water smoothly follows its intended efficient flow path on the deflector. But when the stream expands too greatly, the outer peripheral impingement portions thereof strike the radial surface portions 117 of the deflector 114 too squarely causing interference with the portion of the stream being diverted from the hub surfaces 116. This tends to reduce efficient water reaction on the vanes 118 lessening turning effort.

As shown in FIGS. 26 to 28, the use of a stream deflecting auxiliary shield or stream divider 120 mounted by suitable means such as stays 121 upon the hub 115 provides an ideal control means to enhance the efficiency and operation of the washing device. This shield 120 establishes a central stream inlet throat 122 and forms an annular auxiliary deflector to divert the peripheral outer portions of the supply stream away from contact with the deflector surfaces 117 and diverts the intercepted portion of the stream radially with respect to the screw 113. Thus a smaller diameter portion of stream 110 enters throat 122 of deflector 114 about its hub and functions in uninterrupted fashion to develop the designed wash water pattern and to smoothly actuate the deflector into rotation on screw 113 by free and effective contact with vanes 118 without interference.

Under actual operation, the rate of motion of the deflector 114 does vary somewhat during its bodily travel across the cabinet, slowing down somewhat in the more remote areas away from the nozzle than in areas adjacent the nozzle. This, however, is a beneficial result in a device of this character, using a spinning deflector. While the impact water activity is somewhat lessened remote from the nozzle, the total impact time of water impingement against the dishes in the more remote portions of the cabinet is increased. While there are numerous variables that contribute to the final results in a washing device of this character, the above explanation does introduce a concept shown in FIGS. 26 to 28 that is advantageous as well as new and novel in a dishwashing machine.

As one other suggested modification in the deflector unit 114a, it is to be understood that the diverted water stream coming off of the shield 120 also contributes to the total effort of washing the dishes. For that reason, FIGS. 29 and 30 are added to indicate that a shield such as 125 can be provided with surface configurations 126 for certain water discharge patterns or results, including certain specific vane type deformations 127 that will react under the supply stream 110 to further contribute to the rotation of a deflector assembly such as illustrated in FIG. 26.

The deformed surface auxiliary deflector or shield 125 has an intake throat 128 and support stays 129 suspending a central sleeve 130 that can be secured over the hub 115 of a deflector such as 114.

One other matter of further importance and explanation, the general description has been more or less confined to the formation of a radial sheet of impact water as has been previously discussed under the development in the impingement concept. It is also possible to reduce the stream water outlet supply from the nozzle or to lower the water level in the reservoir by different structural means or through normal operation, so as to develop a condition of lesser radial distributive water force and/or water supply to develop a somewhat different pattern from a sheet or wall of water if desired.

With a reduced water supply or under a reduced force, the spout or stream will strike the deflector in its central area to deflect the water into a sheet, but the sheet only partially tends to hold its form as a sheet for a given or limited radial distance and breaks up or divides into individual water portions as jets or sprays as the outer circular or peripheral expanse becomes larger somewhat as illustrated in FIG. 13.

With this sort of an action, the water pattern still follows the various angular and rotary impingement phases described and the bodily transpositions noted, except that the impingement pattern does vary somewhat in its plane of action from the solid sheet form hereinbefore described. The pattern may, therefore, follow a combination of a solid central portion converting into a spray edged wheel shape somewhat on the order illustrated in FIG. 13 of the drawings if such action is desired under certain conditions of operation.

The general construction last described and directed to the forms of the invention in FIGS. 26 to 30 may be expanded further and developed according to the structures illustrated in FIGS. 31 to 35 inclusive. In FIGS. 31 to 33, the deflector assembly 131 comprises a doubled walled member providing an annular front wall 132 as a shield and a second preformed rear wall 133 acting as the principal deflecting means, the walls being spaced or separated fore and aft to provide a deflection chamber 134 therebetween. A number of spiral vanes 135 are radially arranged and installed between walls 132 and 133 to establish divisional water flow chambers and to introduce reactive means that will impart rotation to the assembly 131 under water flow action.

The wall 133 is secured to a sleeve or hub 136 that includes a swivel key assembly 137 to engage within the grooves of threads 138 on the guide rod 139, the threads 138 being continuous and reversible to cause bodily back and fore actuation of the assembly 131 upon rotation of the latter.

A pump standard 140 has the water discharge nozzle 141 which impels a stream of water axially to the rod 139 toward the assembly 131. As the water stream enlarges, it spreads somewhat radially to cause some initial radial water diversion as per arrows 142 and 143 on the front wall deflector 132 and the balance of the stream outlined by the arrows 144 and 145, all in FIG. 31, enters the throat portion 146 of the wall deflector 132 to change course from axial water motion to radial water flow. The water then moves out of the periphery of the assembly 131 with a proportionate amount thereof moving toward the vanes 135 to rotate the assembly 131 prior to peripheral discharge.

Thus the wash water pattern in the FIG. 31 device follows the principles herein discussed, and more specifically the action parallels the action of the devices illustrated in FIGS. 26 to 30.

FIGS. 34 and 35 portray an assembly 150 of the general design shown in FIG. 31, but providing more vanes 151 in the radial outer portion of the unit, the vanes having their radial inner terminal ends 152 originating in the area of the throat 153 of the annular shield 154 to divert more water into the vane divided chambers 155 of the assembly 150 before radial discharge or diversion from the peripheral portion of assembly 150.

Another modification of a wall diversion assembly is illustrated in FIGS. 36 to 38. In this arrangement, a nozzle 160 directs a water stream outlined by the arrows 161 and 162 along the axis of a continuous reversibly threaded rod 163 toward the water deflector 164. Deflector 164 includes a hub 165 with a swivel key means 166 that coacts with the threads on rod 163 to cause bodily fore and aft motion of the deflector 164 along the rod under the rotative action of the deflector.

In this arrangement, the deflector 164 is a composite cup and spout unit comprising a cup 167 to receive the entire water stream and to divert the same into a radial discharge spout 168. With this deflector the stream is gathered or funnelled into a discharge area in the form of a radial discharge spout which is also turned to cause rotation of the deflector under water reaction. Thus the deflector 164 eliminates the annular shield in this particular suggested construction.

FIGS. 39 and 40 illustrate the use of one or more diversionary discharge instrumentalities. The deflector 170 in the latter means provides the stream receiving cup 171 as a funnelling unit to divert an axially projected stream of wash water over the curved areas thereof into at least two discharge spouts 172 and 173 developed into spiral flow members to cause rotation of deflector 170 under the water flow action.

The deflector 170 has the hub or bearing sleeve 174 having the swivel key means 175 for mounting the deflector upon a reversibly threaded guide rod as shown in the other described dish washing constructions with the swivel key means providing the bodily propulsion of the deflector along the rod.

The above description relates to certain illustrated assemblies and devices all representing structural means adapted to supply the apparatus to carry out the herein defined method of operation of this invention, and these devices should not be considered as providing limiting structures thereof or as confining the practice to the specific apparatus disclosed. It is the language in the following claimed subject matter that is to be construed in defining the breadth and scope of the concept of this dishwashing machine invention.

What I claim is:

1. An article washing machine comprising an enclosure to carry a group of articles to be washed, a washing fluid discharge means to direct a stream of washing fluid among the articles by way of a clearance path extending through said group of articles, deflecting means operably disposed among said articles and in the line of travel of the washing fluid for contact by said fluid stream, orientation means mounted within said enclosure to freely carry the washing fluid deflecting means in spaced relation with respect to said enclosure, said deflecting means being provided with fluid dispersion means on its surface on the side facing the washing fluid stream to deflect said stream of fluid out of its course of travel away from the clearance path and in the direction of the articles surrounding the clearance path upon striking said deflecting means, said latter deflecting means being set in motion by said fluid stream impingement to generate the aforesaid fluid dispersion into the articles, and said deflecting means and said orientation means having cooperative driving mechanisms thereon to cause simultaneous bodily translatory displacement of said deflecting means along said clearance path among the articles to change the impingement zones of said deflected dispersed washing fluid as it strikes the articles being washed, said fluid dispersion means on said deflecting means comprising continuous circumferentially unbroken surface areas formed on the same side of said deflecting means and arranged in different angular positions thereon in relation to the path of travel of said deflecting means to develop fluid dispersion impingement from said deflecting means both in advance of and to the rear of the position of said deflecting means during the bodily actuation thereof.

2. An article washing machine comprising an enclosure to confine a group of said articles, a wash water discharge means to continuously direct a single stream of wash water along a designated path provided through said group of articles, a rotary wash water deflecting means operably disposed for action within said group of articles in the designated path of said single stream and constructed to disperse said stream radially outwardly from its line of travel into the articles surrounding said designated stream path, a support for said deflecting means to carry and to guide the deflecting means for bodily motion along said designated path taken by said wash water penetration among the group of articles, and coacting driving members connected with said rotary deflecting means and with said support respectively and functioning to cause bodily actuation of said deflecting means along the support carrying said deflecting means, said coacting members for the bodily actuation of said deflecting means on said support being rendered operative by the rotation of said deflector means with respect to said support.

3. A washing apparatus to cleanse a group of articles comprising conduit means to continuously direct a single uninterrupted supply stream of washing fluid along a given path with respect to the location of said articles, a rotary deflector to receive said stream on one face thereof having surface configurations on said face to convert and redirect said one stream into a washing fluid pattern for impingement against said articles, a support structure to carry said deflector for rotation thereon and to guide the same axially along said given path through said articles, and reversible actuation means connected with said rotary deflector and with said support structure respectively to cause bodily movement of said deflector in oppositely related axial directions on said support structure, said reversible actuation means being rendered operative by the rotary motion of said deflector relative to said support structure.

4. A washing apparatus to cleanse a group of articles comprising conduit means to direct a supply stream of washing fluid toward the articles, a deflector to convert and to redirect said stream into a washing fluid pattern for impingement against said articles, a support member positioned along the path of said supply stream and through the group of articles, said deflector being mounted transversely for rotation upon said support member and for movement therealong, and actuation means connected with said deflector and with said support member respectively and being rendered operative by the rotation of said deflector upon said support member to bodily actuate the deflector along said support member through the articles, said deflector having surface configurations on a side thereof facing the conduit means and the oncoming supply stream with the impact of the latter on said configurations causing rotation of said deflector, said surface configurations on said deflector including a circumferentially continuous radial convolution contour about the peripheral terminal exit portions of said deflector, certain of said radial convolutions having surface areas directed rearwardly and some forwardly in relation to the general transverse plane of the deflector to generate an undulated fluid pattern providing wavelike radial impingement of said deflected supply stream against the articles toward radial areas disposed in advance of the bodily moving deflector and to the rear thereof as said deflector is actuated by rotation along said support member.

5. A dishwashing machine comprising a cabinet having means to orient dishes within said cabinet space, and water impingement means to wash said dishes comprising a movable water deflector member, a support member fixedly mounted in said cabinet to guide said deflector member along a given path relatively to said dishes, cooperative means on said deflector member and on said support member respectively to impart bodily movement to said deflector member along said fixed support member, and a water supply means to direct water to said deflector member for propulsion toward the dishes in said cabinet, said cooperative means comprising a reversible screw threaded structure on said support member and a key unit on said deflector member to ride in said screw threaded structure for movement back and forth therealong to move said deflector member back and forth in relation to said oriented dishes.

6. A washing apparatus to cleanse a group of articles comprising conduit means to continuously direct a single uninterrupted supply stream of washing fluid along a given path with respect to the location of said articles, a rotary deflector to receive said stream on one face thereof having surface configurations on said face to convert and redirect said one stream into a washing fluid pattern for impingement against said articles, a support structure to carry said deflector for rotation thereon and to guide the same axially along said given path through said articles, reversible actuation means connected with said rotary deflector and with said support structure respectively to cause bodily movement of said deflector in oppositely related axial directions on said support structure, said reversible actuation means being rendered operative by the rotary motion of said deflector relative to said support structure, and an auxiliary shield means for said deflector at the stream receiving side thereof to confine the stream engagement of the deflector to an area extending about the axial portion of the deflector for smooth uninterrupted radial flow of the water stream over the surface configurations on the face of the deflector and off of the peripheral edge of said deflector toward the dishes.

7. A washing apparatus to cleanse a group of articles comprising conduit means to continuously direct a single uninterrupted supply stream of washing fluid along a given path with respect to the location of said articles, a rotary deflector to receive said stream on one face thereof having surface configurations on said face to convert and redirect said one stream into a washing fluid pattern for impingement against said articles, a support structure to carry said deflector for rotation thereon and to guide the same axially along said given path through said articles, reversible actuation means connected with said rotary deflector and with said support structure respectively to cause bodily movement of said deflector in oppositely related axial directions on said support structure, said reversible actuation means being rendered operative by the rotary motion of said deflector relative to said support structure, and an auxiliary shield means for said deflector at the stream receiving side thereof to confine the stream engagement of the deflector to an area extending about the axial portion of the deflector for smooth uninterrupted radial flow of the water stream over the surface configurations on the face of the deflector and off of the peripheral edge of said deflector toward the dishes, said auxiliary shield means being provided with surface configurations thereon comprising certain vane areas to assist in the turning action of said deflector through stream contact and other deformed areas to cause radial stream discharge from said shield means toward said articles to supplement the washing action of the deflector fluid discharge toward the articles.

8. A dishwashing machine comprising a cabinet having means to orient dishes within said cabinet space, and water impingement means to wash said dishes comprising a movable water deflector member, a support member fixedly mounted in said cabinet to guide said deflector member along a given path relatively to said dishes, cooperative means on said deflector member and on said support member respectively to impart bodily movement to said deflector member along said fixed support member, and a water supply means to direct water to said deflector member for propulsion toward the dishes in said cabinet, said cooperative means comprising a reversible screw threaded structure on said support member and a key unit on said deflector member to ride in said screw threaded structure for movement back and fourth therealong to move said deflector member back and forth in relation to said oriented dishes, said deflector member having a shield element thereon to confine the water directed toward the deflector member to impact at the axial region of said deflector member for purely radial travel across the radially outer surface region of said deflector member, said shield element functioning to prevent contact of said water about the outer surface region of the deflector member and to divert excess water outwardly and away from said outer surface region, thus preventing impingement water interference with the radial flow of water over said deflector member.

References Cited by the Examiner
UNITED STATES PATENTS

| | | | |
|---|---|---|---|
| 60,386 | 12/66 | Kirk el al. | 239—186 |
| 260,993 | 7/82 | Kitsee | 239—186 X |
| 643,888 | 2/1900 | Sherman | 134—183 |
| 2,236,791 | 4/41 | Forsberg | 134—183 |
| 2,726,666 | 12/55 | Oxford | 134—181 X |
| 3,051,184 | 8/62 | Gibson | 134—183 |

CHARLES A. WILLMUTH, *Primary Examiner.*